United States Patent
Mamada et al.

(10) Patent No.: US 10,859,008 B2
(45) Date of Patent: Dec. 8, 2020

(54) ROTATIONAL ANGLE DETERMINING DEVICE AND PHASE SHIFT DETECTION METHOD THEREFOR

(71) Applicant: Hitachi Automotive Systems, Ltd., Hitachinaka (JP)

(72) Inventors: Hiroyuki Mamada, Isesaki (JP); Kazuhiko Arai, Isesaki (JP); Shingo Ooba, Isesaki (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/489,797

(22) PCT Filed: Feb. 1, 2018

(86) PCT No.: PCT/JP2018/003478
§ 371 (c)(1),
(2) Date: Aug. 29, 2019

(87) PCT Pub. No.: WO2018/173504
PCT Pub. Date: Sep. 27, 2018

(65) Prior Publication Data
US 2020/0011255 A1 Jan. 9, 2020

(30) Foreign Application Priority Data
Mar. 24, 2017 (JP) .................. 2017-059359

(51) Int. Cl.
*F02D 15/02* (2006.01)
*F02B 75/04* (2006.01)
*G01D 5/243* (2006.01)

(52) U.S. Cl.
CPC ............ *F02D 15/02* (2013.01); *F02B 75/045* (2013.01); *G01D 5/243* (2013.01)

(58) Field of Classification Search
CPC ........ F02D 15/02; G01D 5/243; F02B 75/045
See application file for complete search history.

(56) References Cited

U.S. PATENT DOCUMENTS 4,415,328 A * 11/1983 Grunden .................. F23N 5/203
431/1
6,341,146 B1 * 1/2002 Johnson .............. H04L 27/2337
329/304

(Continued)

FOREIGN PATENT DOCUMENTS

CN        106155041 A * 11/2016
JP        2002-276446 A    9/2002

(Continued)

OTHER PUBLICATIONS

David Varodayan, Introduction to Electronics, Copyright 2014-2019, University of Illinois at Urbana-Champaign, ECE 110, p. 4 (Fig. 6) (Year: 2014).*

(Continued)

*Primary Examiner* — Jacob M Amick
*Assistant Examiner* — Charles Brauch
(74) *Attorney, Agent, or Firm* — Crowell & Moring LLP

(57) ABSTRACT

A rotational angle determining device periodically samples a resolver signal output from a resolver receiving an alternating current excitation signal, the sampling being performed at a timing at which the excitation signal reaches a peak or trough value, based on a timer signal to which initial phase alignment is performed with respect to the excitation (Continued)

signal, and then the device performs A/D conversion of a voltage value of the sampled resolver signal, to determine the rotational angle of the rotor of the resolver. The excitation signal is periodically sampled at a predetermined timing based on the timer signal, and a presence or absence of a phase shift between the excitation and timer signals is detected based on a change in A/D converted value AD1n (n=1, 2, . . . ) obtained by A/D conversion of a voltage value of the sampled excitation signal.

17 Claims, 10 Drawing Sheets

(56) References Cited

U.S. PATENT DOCUMENTS

| | | | |
|---|---|---|---|
| 2003/0172727 A1* | 9/2003 | Herb | G01P 13/04 |
| | | | 73/114.26 |
| 2016/0047904 A1* | 2/2016 | Mellot | G01S 7/4865 |
| | | | 356/5.03 |
| 2017/0298845 A1 | 10/2017 | Kiyomura | |

FOREIGN PATENT DOCUMENTS

| | | |
|---|---|---|
| JP | 2012-98195 A | 5/2012 |
| JP | 2015-169464 A | 9/2015 |
| WO | WO-2015060036 A1 * | 4/2015 |
| WO | WO 2016/072454 A1 | 5/2016 |

OTHER PUBLICATIONS

International Preliminary Report on Patentability (PCT/IB/338, PCT/IB/373, & PCT/IB/326) issued in PCT Application No. PCT/JP2018/003478 dated Oct. 3, 2019, including English translation of document C2 (Japanese-language Written Opinion (PCT/ISA/237) previously filed on Aug. 29, 2019) (11 pages).

International Search Report (PCT/ISA/210) issued in PCT Application No. PCT/JP2018/003478 dated Mar. 13, 2018 with English translation (three (3) pages).

Japanese-language Written Opinion (PCT/ISA/237) issued in PCT Application No. PCT/JP2018/003478 dated Mar. 13, 2018 (three (3) pages).

* cited by examiner

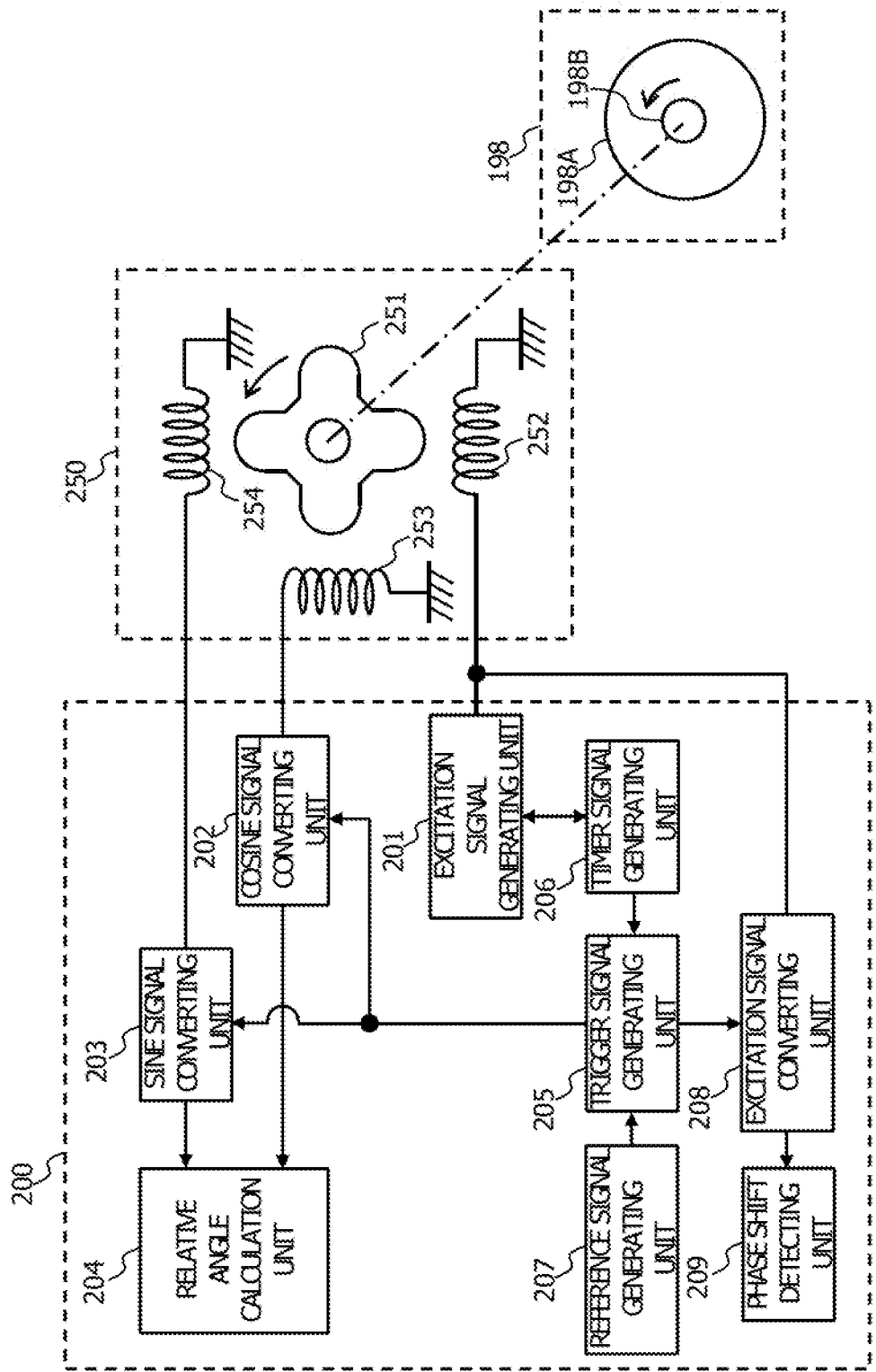

ROTATIONAL ANGLE DETERMINING DEVICE AND PHASE SHIFT DETECTION METHOD THEREFOR

TECHNICAL FIELD

The present invention relates to rotational angle determining devices including resolvers, and relates to phase shift detection methods therefor.

BACKGROUND ART

As a conventional rotational angle determining device, a device that utilizes the fact that the amplitude of an induced voltage induced through a rotor in two detecting coils fixed with a phase difference of 90° by an alternating current excitation signal supplied to an exciting coil of a resolver, varies in cosine-like and sinusoidal-like fashions as the rotor rotates, is known (see, for example, Patent Document 1). In such a rotational angle determining device, a resolver signal output from each of the two detecting coils is sampled at timings corresponding to a peak or trough value based on a timer signal with a period which is a predetermined multiple of a period of an excitation signal, and then, the rotational angle of the rotor is determined based on digital data obtained by analog-to-digital (A/D) conversion of the sampled voltage value.

REFERENCE DOCUMENT LIST

Patent Document

Patent Document 1: JP 2012-98195 A

SUMMARY OF THE INVENTION

Problem to be Solved by the Invention

In order to prevent the sampling of the A/D conversion from being made at an erroneous timing due to a phase shift between the excitation signal and the timer signal, the synchronization between the timer signal and the excitation signal may be monitored by a built-in self-test (BIST) function or a monitoring timer for measuring periods, provided in a computer mounted in the abovementioned rotational angle determining device, or the like.

However, in such a computer mounted in the abovementioned rotational angle determining device, hardware resources to which the BIST function or the monitoring timer may be allocated, trends to decrease in the viewpoint of cost reduction. Thus, it is desired to maintain a function of monitoring the synchronization between the excitation signal and the timer signal even in such a rotational angle determining device.

Thus, in view of this problem, an object of the present invention is to provide a rotational angle determining device capable of detecting a phase shift between an excitation signal and a timer signal while reducing cost.

Means for Solving the Problem

According to the present invention, a rotational angle determining device comprises:

a resolver that receives an alternating current excitation signal, and outputs an alternating current resolver signal induced by the excitation signal and having an amplitude that changes corresponding to a rotational angle of a rotor;

a resolver signal converting unit that periodically samples the resolver signal at a timing at which the excitation signal reaches a peak or trough value in a case in which no phase shift has occurred between the excitation signal and a timer signal, based on the timer signal to which initial phase alignment is performed with respect to the excitation signal, and performs A/D conversion of a voltage value of the sampled resolver signal; and a rotational angle calculating unit that calculates a rotational angle of the rotor based on a first converted value obtained by the A/D conversion performed by the resolver signal converting unit, and the rotational angle determining device further comprises:

an excitation signal converting unit that periodically samples the excitation signal at a predetermined timing based on the timer signal, and performs A/D conversion of a voltage value of the sampled excitation signal; and a phase shift detecting unit that detects a presence or absence of a phase shift based on a second converted value obtained by the A/D conversion performed by the excitation signal converting unit.

Furthermore, according to the present invention, a phase shift detection method of a rotational angle determining device including: a resolver that receives an alternating current excitation signal, and outputs an alternating current resolver signal induced by the excitation signal and having an amplitude that changes corresponding to a rotational angle of a rotor; a resolver signal converting unit that periodically samples the resolver signal at a timing at which the excitation signal reaches a peak or trough value in a case in which no phase shift has occurred between the excitation signal and a timer signal, based on the timer signal to which initial phase alignment is performed with respect to the excitation signal and performs A/D conversion of a voltage value of the sampled resolver signal; and a rotational angle calculating unit that calculates a rotational angle of the rotor based on a first converted value obtained by the A/D conversion performed by the resolver signal converting unit, the phase shift detection method comprises the steps, performed by the rotational angle determining device, of:

periodically sampling the excitation signal at a predetermined timing based on the timer signal;

performing the A/D conversion of a voltage value of the sampled excitation signal to obtain a second converted value; and detecting a presence or absence of a phase shift based on the second converted value.

Effects of the Invention

According to the rotational angle determining device of the present invention, it is possible to detect the phase shift between the excitation signal and the timer signal while reducing the cost.

BRIEF DESCRIPTION OF THE DRAWINGS

FIG. 2 is a configuration diagram illustrating an example of a relative angle determining device according to a first embodiment.

MODE FOR CARRYING OUT THE INVENTION

Hereinbelow, embodiments of the present invention will be described in detail with reference to the accompanying drawings.

Figure 1:
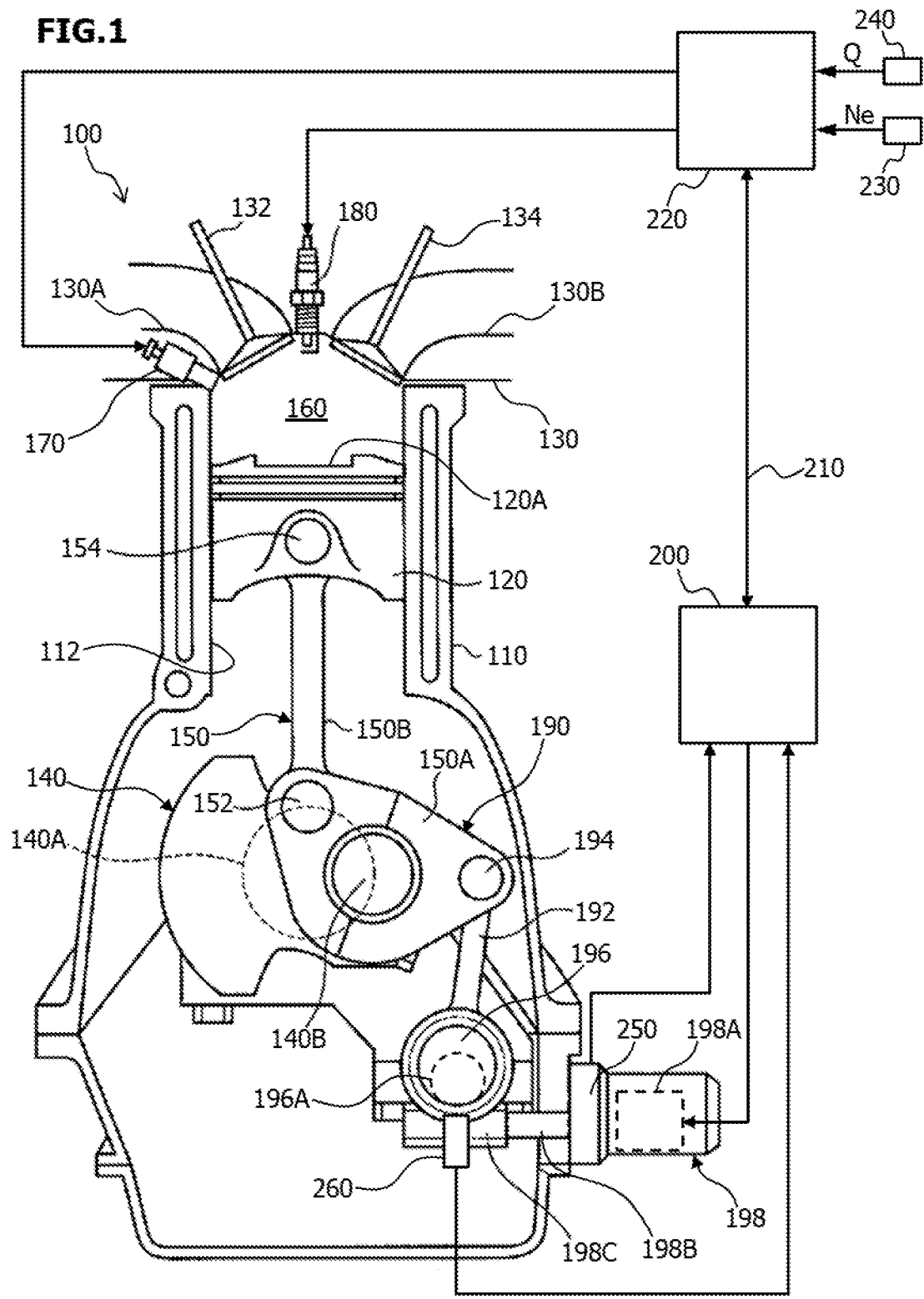
FIG. 1 is a configuration diagram illustrating an example of an internal combustion engine for a vehicle.

FIG. 1 illustrates an example of an internal combustion engine for a vehicle.

An internal combustion engine 100 includes a cylinder block 110, a piston 120 inserted in a cylinder bore 112 of a cylinder block 110 in a manner capable of reciprocating movement, a cylinder head 130 having an intake port 130A and an exhaust port 130B, and an intake valve 132 and an exhaust valve 134 that open and close open ends of intake port 130A and exhaust port 130B, respectively.

Piston 120 is connected to a crankshaft 140 via a connecting rod 150 including a lower link 150A and an upper link 150B. A combustion chamber 160 is formed between a crown surface 120A of piston 120 and a lower surface of cylinder head 130. To cylinder head 130, there are mounted a fuel injection valve 170 for injecting fuel, and an ignition plug 180 for igniting a mixture of fuel and air, facing combustion chamber 160.

Crankshaft 140 includes multiple journal portions 140A and multiple crank pin portions 140B. Journal portions 140A are rotatably supported by main bearings (not illustrated) of cylinder block 110. Crank pin portions 140B are eccentric to journal portions 140A, and lower link 150A is rotatably coupled to each of crank pin portions 140B. Upper link 150B has a lower end rotatably coupled to one end of lower link 150A by a coupling pin 152 and has an upper end rotatably coupled to piston 120 by a piston pin 154.

Internal combustion engine 100 includes a variable compression ratio (VCR) mechanism 190 that makes the compression ratio variable by changing the volume of combustion chamber 160.

By changing the volume of combustion chamber 160 using, for example, a multi-link mechanism as disclosed in JP 2002-276446 A, VCR mechanism 190 makes the compression ratio of internal combustion engine 100 variable. Hereinbelow, an example of VCR mechanism 190 will be described.

In the VCR mechanism 190, a control link 192 has an upper end rotatably coupled to the other end of lower link 150A by a coupling pin 194 and has a lower end rotatably coupled to a lower portion of cylinder block 110 via a control shaft 196. Specifically, control shaft 196 is rotatably supported by the engine body (cylinder block 110) and has an eccentric cam portion 196A that is eccentric to the rotation center of control shaft 196. A lower end portion of control link 192 is rotatably fitted to eccentric cam portion 196A. Control shaft 196 is connected in an engaged manner to an output shaft 198B of a compression ratio control actuator 198 using electric motor 198A as a power source, via a speed reducer 198C. The rotational position of control shaft 196 is controlled by rotating motion of output shaft 198B of compression ratio control actuator 198.

In VCR mechanism 190 using such a multi-link mechanism, when control shaft 196 is rotated by compression ratio control actuator 198, the center position of eccentric cam portion 196A, that is, a vertical position relative to the engine body (cylinder block 110) changes. This changes the pivotal support position of the lower end of control link 192, so that the position of piston 120 at the piston top dead center (TDC) becomes higher or lower, and thus, the volume of combustion chamber 160 increases or decreases to change the compression ratio of internal combustion engine 100. When the actuation (energization) of compression ratio control actuator 198 is stopped, control link 192 rotates relative to eccentric cam portion 196A of control shaft 196 by the reciprocating motion of piston 120, so that the compression ratio shifts to the low compression side.

VCR mechanism 190 is electronically controlled by a VCR controller 200 incorporating a processor, such as a microcomputer. VCR controller 200 is communicably connected to an engine controller 220, incorporating a processor, such as a microcomputer, and configured to electronically control internal combustion engine 100, via, for example, a controller area network (CAN) 210, which is an example of an in-vehicle network. Therefore, freely chosen data can be sent and received between VCR controller 200 and engine controller 220 via CAN 210.

As an example of an operating state of internal combustion engine 100, output signals of a rotational speed sensor 230 that determines rotational speed Ne of internal combustion engine 100, and a load sensor 240 that determines load Q of internal combustion engine 100 are input to engine controller 220. Herein, as load Q of internal combustion engine 100, a state quantity closely related to torque, such as intake negative pressure, intake flow rate, supercharging pressure, accelerator opening degree, or throttle opening degree, can be used. For example, by referring to maps in which compression ratio matching rotational speeds and loads are set, engine controller 220 calculates a target compression ratio of VCR mechanism 190 corresponding to rotational speed Ne and load Q of internal combustion engine 100. Then, engine controller 220 sends data of the target compression ratio to VCR controller 200 via CAN 210.

VCR controller 200 having received the data of the target compression ratio controls a drive current to be output to compression ratio control actuator 198 (electric motor 198A) of VCR mechanism 190 such that a real compression ratio (actual compression ratio) that is determined by a later-described compression ratio sensor converges to the target compression ratio. For example, VCR controller 200 controls a drive current supplied to compression ratio control actuator 198 by outputting a pulse width modulation (PWM) signal to control terminals of semiconductor switching elements to turn on or off the semiconductor switching elements. In this case, VCR controller 200 calculates a duty cycle, which is the on/off time ratio of the semiconductor switching elements, based on a difference between the target compression ratio and the actual compression ratio, and outputs a PWM signal with this duty cycle.

The compression ratio sensor that determines an actual compression ratio of internal combustion engine 100 includes: a resolver 250, which is a relative angle sensor for determining relative angle θr of output shaft 198B of compression ratio control actuator 198; and an absolute angle sensor 260 for determining absolute angle θa of control shaft 196 connected in a meshed manner to output shaft 198B of compression ratio control actuator 198. Herein, resolver 250 determines a rotational angle of output shaft 198B of compression ratio control actuator 198 in a range of 0 to 360°. VCR controller 200 calculates an absolute angle of control shaft 196 by adding relative angle θr, which is an amount of change of the rotational angle, based on an output value of resolver 250, to absolute angle θa based on an output value of absolute angle sensor 260 at the time of engine start-up. Then, VCR controller 200 determines the actual compression ratio of internal combustion engine 100 corresponding to the absolute angle of control shaft 196. The reason for using resolver 250 and absolute angle sensor 260 is that resolver 250 has high resolution although, for example, it cannot distinguish between 0° and 360° of the same phase, and absolute angle sensor 260 can determine an absolute angle of control shaft 196 although it has low resolution.

First Embodiment

FIG. 2 illustrates an example of a first embodiment of a relative angle determining device that determines relative angle θr. The relative angle determining device (rotational angle determining device) is composed of resolver 250 and a part of VCR controller 200. Resolver 250 receives an excitation signal from VCR controller 200, and outputs a resolver signal corresponding to a rotational angle of output shaft 198B of compression ratio control actuator 198. VCR controller 200 determines relative angle θr based on the resolver signal output from resolver 250.

Resolver 250 includes a rotor 251, an exciting coil 252, and a pair of detecting coils 253, 254. Rotor 251 is coupled coaxially with output shaft 198B of compression ratio control actuator 198, and rotates integrally with output shaft 198B of compression ratio control actuator 198. Exciting coil 252 is supplied with the excitation signal from VCR controller 200. Each of the pair of detecting coils 253, 254 outputs, as the resolver signal, an electromotive voltage induced through rotor 251 by the electromagnetic force of exciting coil 252 to which the excitation signal is supplied. Detecting coils 253, 254 are fixed in the vicinity of rotor 251 with a phase difference of 90°. Furthermore, a circumferential side surface of rotor 251 is formed to be uneven so that the distance or the gap from detecting coils 253, 254 varies periodically corresponding to the rotational angle of rotor 251.

Figure 3A:
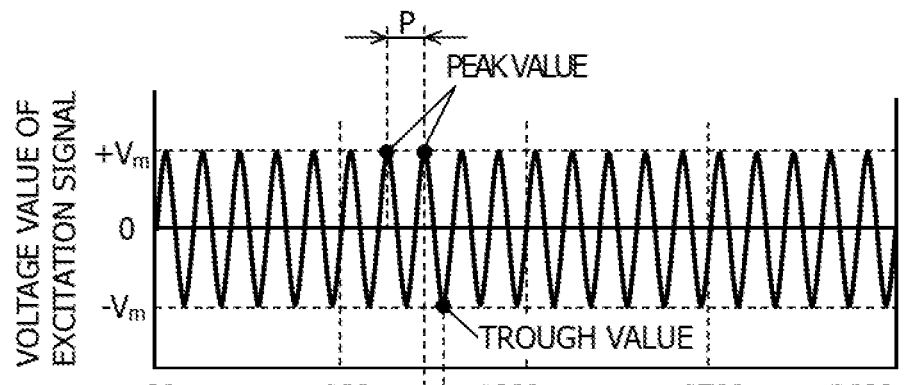
FIGS. 3A to 3C are schematic diagrams for explaining an excitation signal and resolver signals of a resolver.
Figure 3B:
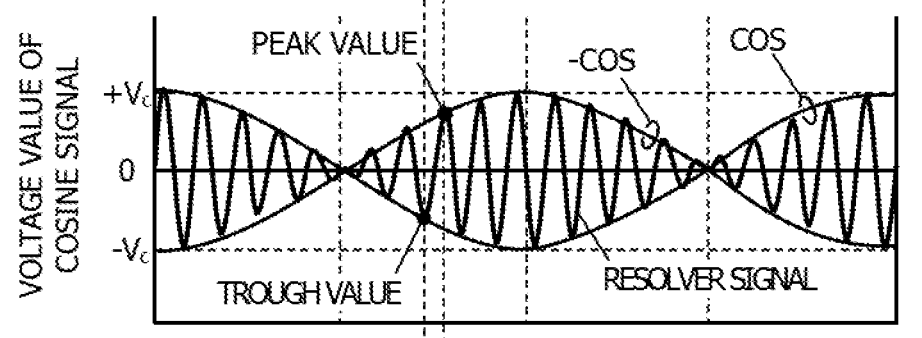
Figure 3C:
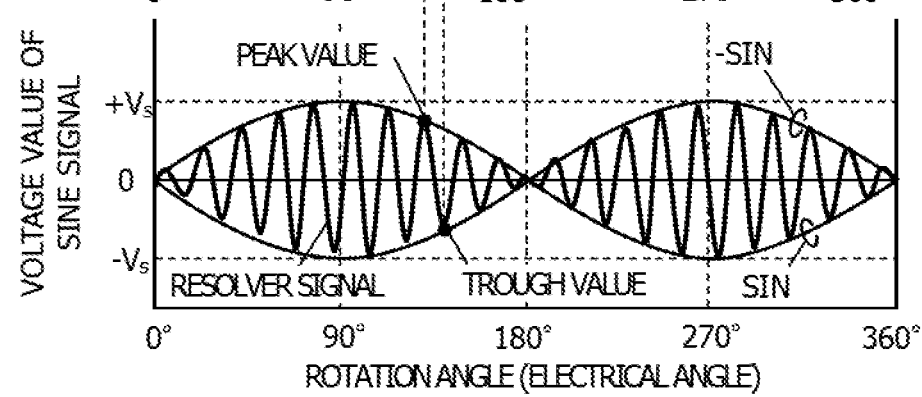

FIG. 3 illustrates the relationship between a voltage value of the excitation signal supplied to exciting coil 252 of resolver 250 and voltage values of resolver signals (cosine signal and sine signal) output from the pair of detecting coils 253, 254 as rotor 251 of resolver 250 rotates. As illustrated in of FIG. 3A, the excitation signal supplied from VCR controller 200 to exciting coil 252 is an alternating voltage having period P (for example, 100 μs) and an amplitude of ($-V_m$ to $+V_m$), such as a sine wave. On the other hand, since the resolver signals output from the pair of detecting coils 253, 254 are signals of electromotive voltages induced through rotor 251 by the electromagnetic force of exciting coil 252 to which the excitation signal is supplied, each resolver signal is a signal of an alternating voltage having peak and trough values at substantially the same timings as the excitation signal has peak and trough values, as illustrated in FIG. 3B and FIG. 3C.

However, when rotor 251 of resolver 250 rotates with the rotation of output shaft 198B of compression ratio control actuator 198, detecting coil 253 outputs the resolver signal in which an amplitude (peak to trough value) of electromotive voltage generated by the electromagnetic force of exciting coil 252 varies in accordance with a cosine wave (COS or —COS) having an amplitude ranging between voltage values ($-V_c$ to $+V_c$), with respect to the rotational angle of rotor 251, as illustrated in FIG. 3B. Furthermore, as illustrated in FIG. 3C, detecting coil 254 outputs the resolver signal in which an amplitude (peak to trough value) of electromotive voltage generated by the electromagnetic force of exciting coil 252 varies in accordance with a sine wave (SIN or –SIN) having an amplitude raging between voltage values ($-V_s$ to $+V_s$), with respect to the rotational angle of rotor 251. Thus, if it is possible to determine a peak or trough value of each resolver signal output from the corresponding detecting coil 253, 254, it is possible to determine a rotational angle of rotor 251, ultimately relative angle θr. Hereinafter, the resolver signal output from detecting coil 253 is referred to as a cosine signal, and the resolver signal output from detecting coil 254 is referred to as a sine signal.

Referring again to FIG. 2, VCR controller 200 includes an excitation signal generating unit 201, a cosine signal converting unit 202, a sine signal converting unit 203, and a relative angle calculating unit (rotational angle calculating unit) 204. Excitation signal generating unit 201 generates the excitation signal to be output to exciting coil 252 of resolver 250 based on a built-in clock signal output from a built-in oscillator (not illustrated). Cosine signal converting unit 202 is an analog-to-digital (A/D) converter that samples the cosine signal output from detecting coil 253 of resolver 250 and performs A/D conversion of the obtained voltage value. Sine signal converting unit 203 is an A/D converter that samples the sine signal output from detecting coil 254 of resolver 250 and performs A/D conversion of the obtained voltage value. Relative angle calculating unit 204 calculates arctangent (ARCTAN) based on the digital data that is the A/D converted values (first converted value) converted by cosine signal converting unit 202 and sine signal converting unit 203, to calculate the rotational angle of rotor 251, ultimately relative angle θr. Cosine signal converting unit 202 and sine signal converting unit 203 constitute a resolver signal converting unit.

VCR controller 200 further includes a trigger signal generating unit 205, a timer signal generating unit 206, and a reference signal generating unit 207. Trigger signal generating unit 205 generates a trigger signal, serving as a reference of the sampling timing in cosine signal converting unit 202 and sine signal converting unit 203. Timer signal generating unit 206 generates a timer signal for generating the trigger signal in trigger signal generating unit 205 with a doubled period of the excitation signal, based on the built-in clock signal output from the built-in oscillator (not illustrated). Reference signal generating unit 207 generates a reference signal of which a voltage level (voltage value) is compared with that of the timer signal in order to generate the trigger signal in trigger signal generating unit 205. For example, before starting the sampling of the A/D conversion in cosine signal converting unit 202 and sine signal converting unit 203, such as when the ignition switch is turned on and the power supply voltage is supplied to VCR controller 200, excitation signal generating unit 201 and timer signal generating unit 206 are configured to generate the excitation signal and the timer signal, in a state in which initial phase alignment is performed to make the initial phases of the excitation signal and the timer signal coincide with each other.

Figure 4:
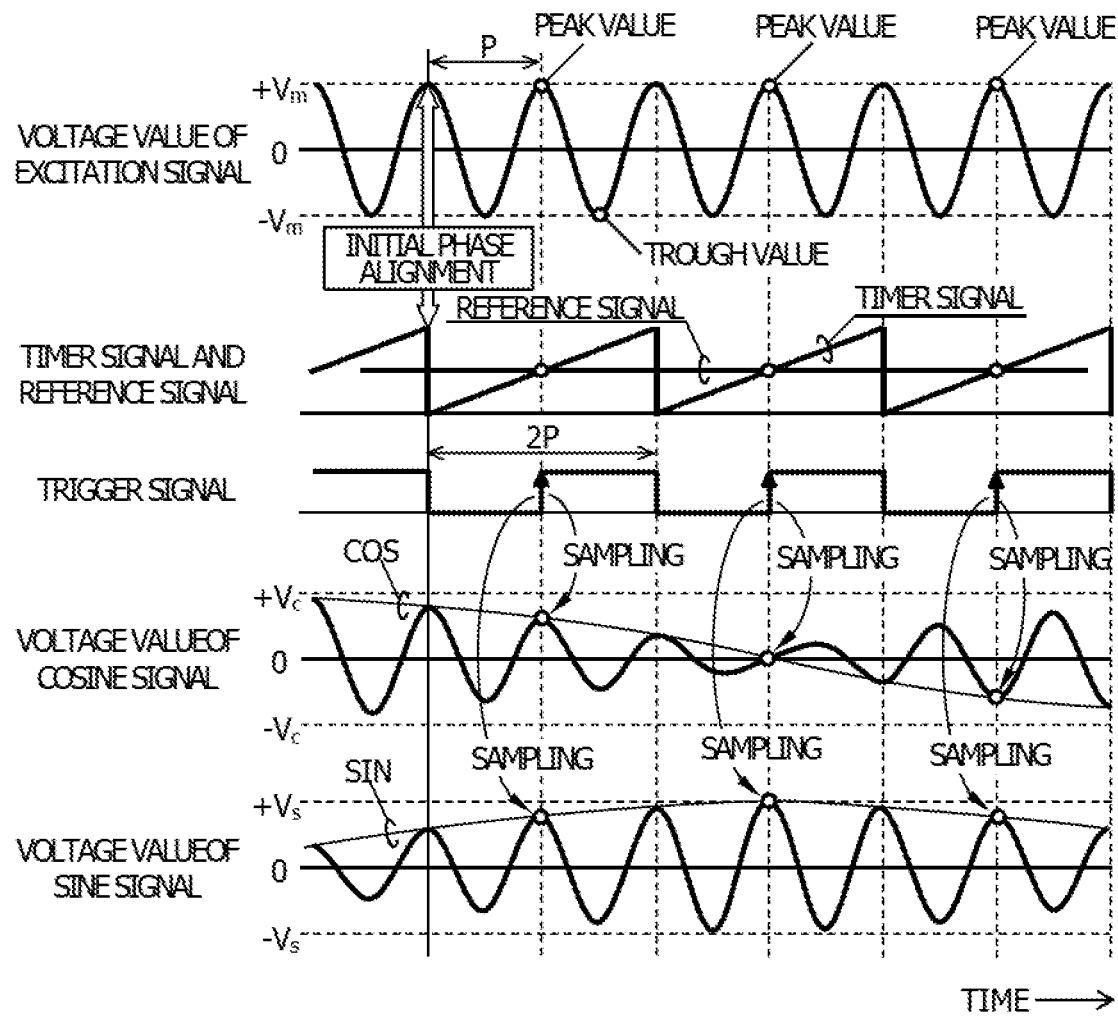
FIG. 4 is a timing diagram illustrating sampling timings of A/D conversion.

FIG. 4 illustrates an example of sampling timings of the A/D conversion. First, excitation signal generating unit 201 and timer signal generating unit 206 mutually perform initial phase alignment between the excitation signal and the timer signal before starting sampling of the A/D conversion, and then, excitation signal generating unit 201 and timer signal generating unit 206 generate the excitation signal and the timer signal, respectively. The timer signal generated in timer signal generating unit 206 is a triangular wave or sawtooth wave signal having period 2P (for example, 200 μs), which is double period P of the excitation signal generated in excitation signal generating unit 201. The trigger signal generated in trigger signal generating unit 205 changes from low electric potential to high electric potential (or from high electric potential to low electric potential) when the voltage level of the timer signal generated in timer signal generating unit 206 reaches the voltage level or more of the reference signal generated in reference signal generating unit 207. The level of the reference signal generated in reference signal generating unit 207 is set in advance such that the rising (or falling) timing of the trigger signal generated in trigger signal generating unit 205 based on the reference signal and the timer signal coincides with the timing at which the excitation signal reaches a peak value which is maximum voltage value ($+V_m$), out of the peak and trough values. Then, triggered by the rise (or fall) of the trigger signal generated in the trigger signal generating unit 205, cosine signal converting unit 202 samples the cosine signal and performs the A/D conversion of the obtained voltage value, and sine signal converting unit 203 samples the sine signal and performs the A/D conversion of the obtained voltage value. At this time, cosine signal converting unit 202 can sample a peak or trough value in one period of the cosine signal, and sine signal converting unit 203 can sample a peak or trough value in one period of the sine signal. In short, each of cosine signal converting unit 202 and sine signal converting unit 203 periodically samples the resolver signal at a timing at which the excitation signal reaches the peak or trough value in a case in which no phase shift has occurred between the excitation signal and the timer signal, based on the timer signal to which the initial phase alignment is performed with respect to the excitation signal, and performs the A/D conversion of the voltage value of the sampled resolver signal.

Figure 5:
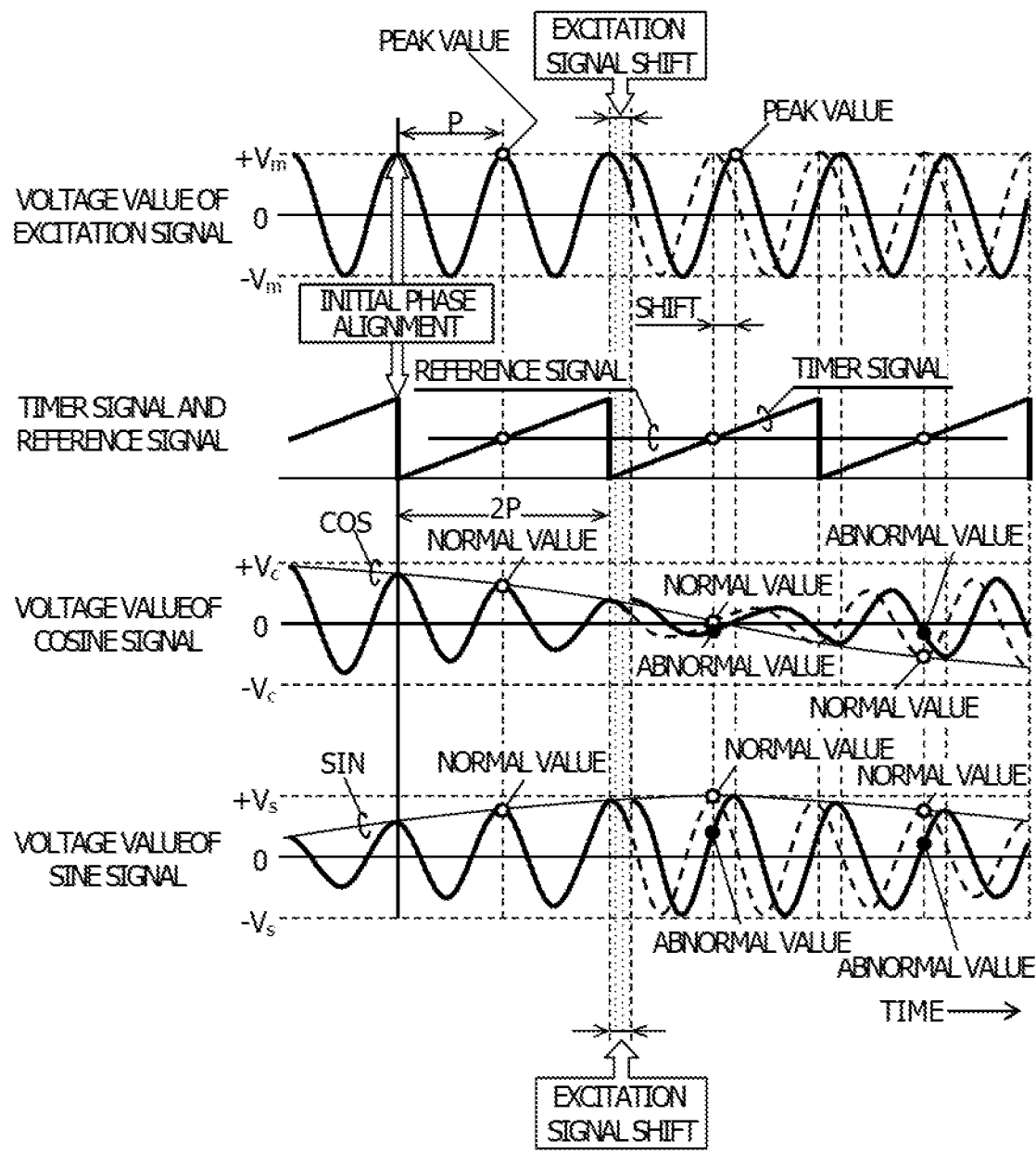
FIG. 5 is a timing diagram illustrating a change in sampling value of the resolver signal caused by a phase shift.

However, as illustrated in FIG. 5, if the phase of the excitation signal shifts with respect to the timer signal due to some factor after performing initial phase alignment between the excitation signal and the timer signal, the timing at which the excitation signal reaches the peak or trough value deviates from the sampling timing, and the timing at which the cosine signal and the sine signal reaches the peak or trough value also deviates from the sampling timing. Thus, although cosine signal converting unit 202 and sine signal converting unit 203 can sample the peak or trough value (normal value) in one period of the cosine signal and the sine signal, respectively, in a state in which no phase shift has occurred, cosine signal converting unit 202 and sine signal converting unit 203 might sample a voltage value (abnormal value) which is deviated from the peak or trough value in one period of the cosine signal and the sine signal, respectively, in a state in which a phase shift has occurred. Therefore, there is also a concern that when the sampled abnormal value is subjected to the A/D conversion, the rotational angle of rotor 251, ultimately relative angle θr, cannot be accurately determined. A similar concern may arise in a case in which a phase shift has occurred in the timer signal with respect to the excitation signal.

Thus, as illustrated in FIG. 2, the relative angle determining device of the present embodiment further includes an excitation signal converting unit 208 and a phase shift detecting unit 209. Excitation signal converting unit 208 samples the excitation signal generated in excitation signal generating unit 201 and performs the A/D conversion of the obtained voltage value. Phase shift detecting unit 209 detects a presence or absence of a phase shift between the excitation signal and the timer signal based on the digital data that is the A/D converted value (second converted value) converted by excitation signal converting unit 208.

Here, relative angle calculating unit 204 and phase shift detecting unit 209, which are a part of the relative angle determining device, may be implemented by reading a program stored in advance in a non-volatile memory, such as a read only memory (ROM), in the processor of VCR controller 200, or may be partially or entirely implemented by the hardware configuration. Furthermore, another configuration of the relative angle determining device may be partially or entirely implemented by hardware; for example, trigger signal generating unit 205 may be configured as a comparing circuit provided with a comparator.

Similarly to the sampling timing of the cosine signal and the sine signal, a timing at which excitation signal converting unit 208 samples the excitation signal is the timing at which the trigger signal generated in trigger signal generating unit 205 rises (or falls) (see FIG. 4). That is, excitation signal converting unit 208 periodically samples the excitation signal at the same timing as cosine signal converting unit 202 and sine signal converting unit 203 sample. Excitation signal converting unit 208 sequentially stores A/D converted value $AD1_n$ (n=1, 2, . . . ), which is the digital data obtained by the A/D conversion of a voltage value of the sampled excitation signal, in a volatile memory, such as a random access memory (RAM).

A phase shift detection method in a case in which a phase shift has occurred in the excitation signal with respect to the timer signal will be described with reference to FIG. 6. When excitation signal converting unit 208 samples a voltage value of the excitation signal in a state in which no phase shift has occurred in the excitation signal with respect to the timer signal, excitation signal converting unit 208 samples the peak value of the excitation signal. Assuming that the A/D converted value at this time is $AD1_0$, A/D converted value $AD1_0$ is a value corresponding to maximum voltage value ($+V_m$) of the excitation signal. In contrast, when excitation signal converting unit 208 samples a voltage value of the excitation signal in a state in which phase shifts Δt1 (≠P) and Δt2 (>Δt1 and ≠P) have occurred in the excitation signal with respect to the timer signal, excitation signal converting unit 208 samples voltage values deviating from the timing at which the excitation signal reaches the peak value. Assuming that the A/D converted value after phase shift Δt1 is $AD1_1$ and the A/D converted value after phase shift Δt2 is $AD1_2$, A/D converted values $AD1_1$ and $AD1_2$ change from A/D converted value $AD1_0$. That is, if phase shifts Δt1 and Δt2 of the excitation signal with respect to the timer signal is not a positive multiple of period P of the excitation signal, A/D converted values $AD1_1$ and $AD1_2$ change from A/D converted value $AD1_0$. Therefore, by monitoring A/D converted values $AD1_n$ (n=1, 2, . . . ) by phase shift detecting unit 209, it is possible to detect whether there has occurred a phase shift of the excitation signal with respect to the timer signal.

A phase shift detection method in a case in which a phase shift has occurred in the timer signal with respect to the excitation signal will be described with reference to FIG. 7. When excitation signal converting unit 208 samples a voltage value of the excitation signal in a state in which no phase shift has occurred in the timer signal with respect to the excitation signal, excitation signal converting unit 208 samples the peak value of the excitation signal. Assuming that the A/D converted value obtained at this time is $AD1_0$, A/D converted value $AD1_0$ is a value corresponding to maximum voltage value ($+V_m$) of the excitation signal. In contrast, when excitation signal converting unit 208 samples a voltage value of the excitation signal in a state in which phase shifts $\Delta t1$ ($\neq P$) and $\Delta t2$ ($>\Delta t1$ and $\neq P$) have occurred in the timer signal with respect to the excitation signal, excitation signal converting unit 208 samples voltage values of the phase which shifts from the timing at which the excitation signal reaches the peak value. Assuming that the A/D converted value after phase shift $\Delta t1$ is $AD1_1$ and the A/D converted value after phase shift $\Delta t2$ is $AD1_2$, A/D converted values $AD1_1$ and $AD1_2$ change from A/D converted value $AD1_0$. That is, if phase shifts $\Delta t1$ and $\Delta t2$ of the timer signal with respect to the excitation signal is not a positive multiple of period P of the excitation signal, A/D converted values $AD1_1$ and $AD1_2$ change from A/D converted value $AD1_0$. Therefore, by monitoring A/D converted values $AD1_n$(n=1, 2, . . . ) by phase shift detecting unit 209, it is possible to detect whether there is occurred a phase shift of the timer signal with respect to the excitation signal.

Phase shift detecting unit 209 detects a presence or absence of a phase shift between the timer signal and the excitation signal, based on whether A/D converted value $AD1_n$(n=1, 2, . . . ) stored in the volatile memory, changes from A/D converted value $AD1_0$ obtained by the A/D conversion of maximum voltage value ($+V_m$) of the excitation signal sampled in a state in which no phase shift has occurred. A/D converted value $AD1_0$ is stored in advance in a non-volatile memory, such as a read only memory (ROM).

Figure 6:
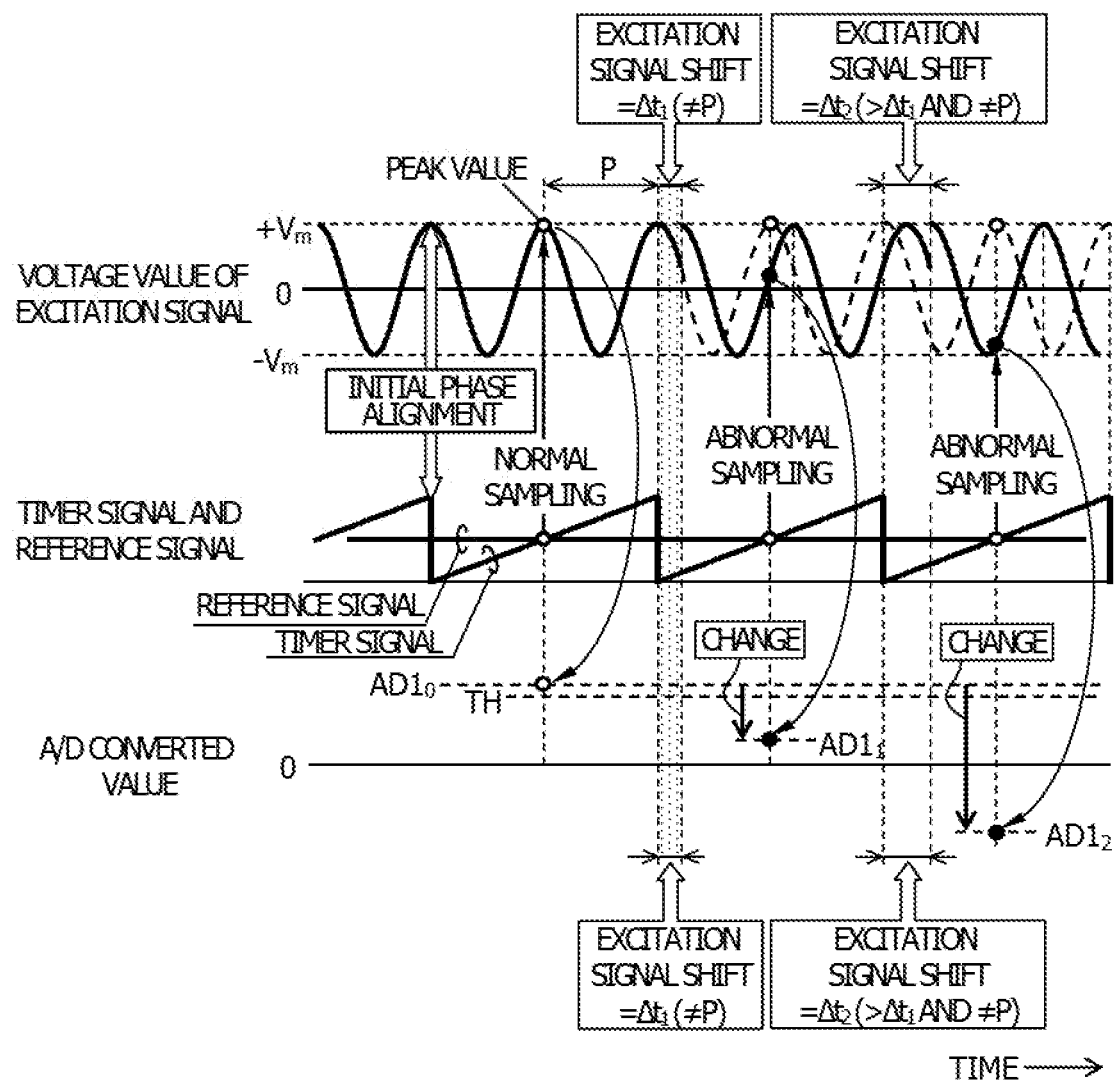
FIG. 6 is a timing diagram illustrating a change in excitation signal converted value caused by excitation signal shift.
Figure 7:
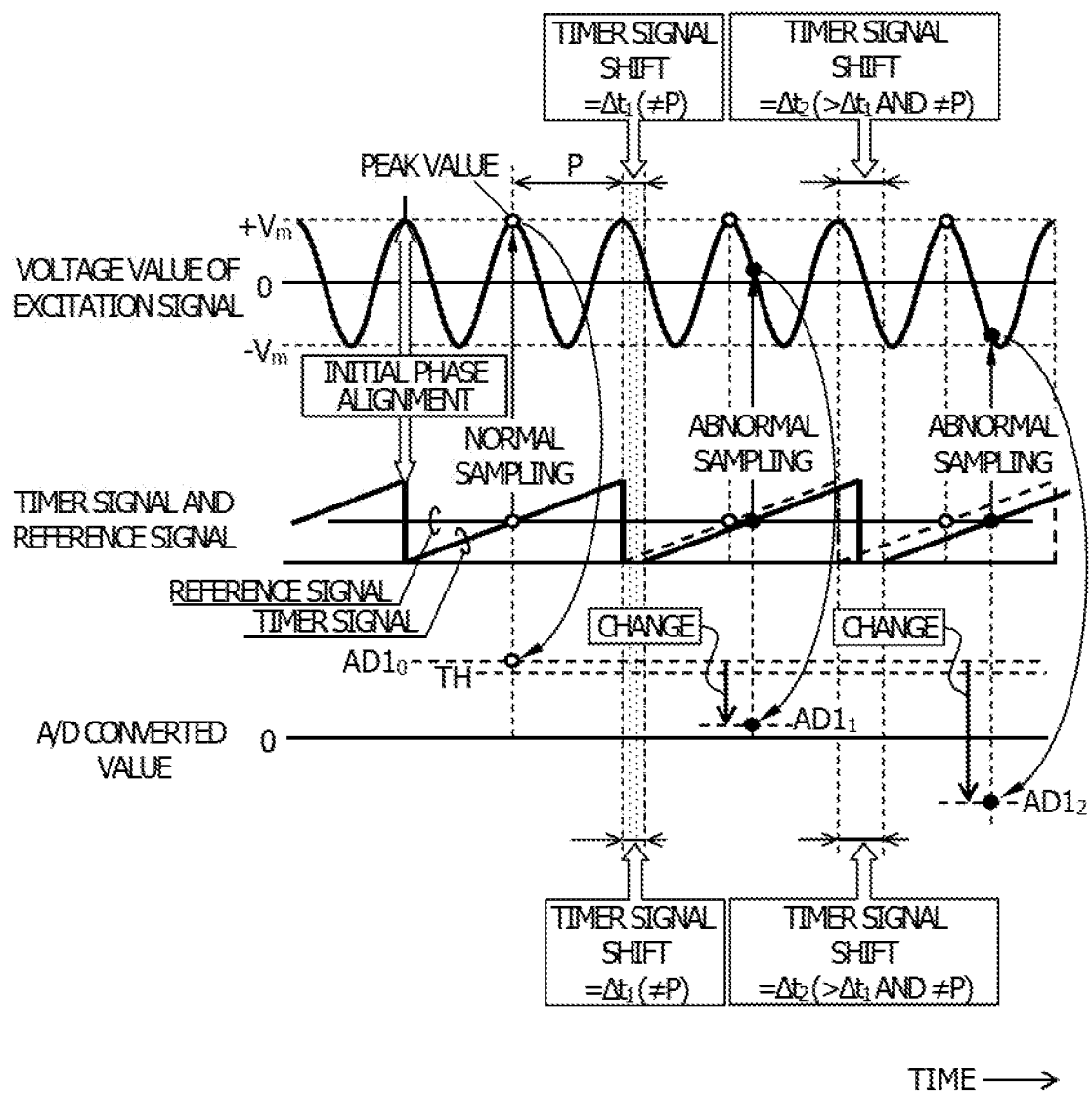
FIG. 7 is a timing diagram illustrating a change in excitation signal converted value caused by timer signal shift.

Specifically, referring to FIGS. 6 and 7, for example, in VCR controller 200, a neighboring value less than or equal to A/D converted value $AD1_0$ is stored in advance in a non-volatile memory, such as a ROM, as threshold TH for detecting a presence or absence of a phase shift, and phase shift detecting unit 209 determines that no phase shift has occurred between the timer signal and the excitation signal when A/D converted value $AD1_n$(n=1, 2, . . . ) is greater than or equal to threshold TH, whereas phase shift detecting unit 209 determines that a phase shift has occurred between the timer signal and the excitation signal when A/D converted value $AD1_n$(n=1, 2, . . . ) is less than threshold TH.

When phase shift detecting unit 209 determines that a phase shift has occurred between the timer signal and the excitation signal, VCR controller 200 can perform the following fail-safe processing. For example, VCR controller 200 may stop feedback control that causes the actual compression ratio of internal combustion engine 100 to converge to the target compression ratio. That is, VCR controller 200 may fix the absolute angle of control shaft 196 by maintaining a state of a drive current output to compression ratio control actuator 198 (electric motor 198A) of VCR mechanism 190 to a state when the phase shift occurs. Alternatively, VCR controller 200 may shift the compression ratio to the low compression side by stopping output of the drive current to compression ratio control actuator 198. Alternatively, VCR controller 200 may forcibly actuate compression ratio control actuator 198 to a mechanical initial position, which limits the rotation of control shaft 196, regardless of the value of the target compression ratio. If this mechanical initial position defines the known initial angle of control shaft 196, the feedback control for causing the actual compression ratio of internal combustion engine 100 to converge to the target compression ratio may be performed again after control shaft 196 is made to rotate to the mechanical initial position and the absolute angle of control shaft 196 is reset to the initial angle.

In the abovementioned relative angle determining device, the level of the reference signal generated in reference signal generating unit 207 is set in advance such that the rising (or falling) timing of the trigger signal generated in trigger signal generating unit 205, based on comparison between the timer signal and the reference signal, coincides with a timing at which the excitation signal reaches the peak value which is maximum voltage value ($+V_m$), of the peak and trough values in one period of the excitation signal (see FIG. 4). Alternatively, the level of the reference signal may be set such that the rising (or falling) timing of the trigger signal generated in trigger signal generating unit 205 coincides with the timing at which the excitation signal reaches a trough value which is minimum voltage value ($-V_m$) of the excitation signal. In this case, phase shift detecting unit 209 can also detect a presence or absence of a phase shift between the excitation signal and the timer signal, based on a change in A/D converted value obtained by sampling the excitation signal and then by performing the A/D conversion of the obtained voltage value by excitation signal converting unit 208. In short, in the relative angle determining device, when the sampling timings of the cosine signal and the sine signal are set based on the timer signal and the reference signal so as to coincide with the timing at which the excitation signal reaches a peak or trough value in one period of the excitation signal, it is possible to detect a presence or absence of a phase shift between the excitation signal and the timer signal based on a change in the A/D converted value at the time of sampling the voltage value of the excitation signal at the set sampling timings.

Although the period of the timer signal is double period P of the excitation signal, the present invention is not limited thereto. For example, the period of the timer signal may be a predetermined multiple of period P, such as multiplying period P by one, or three or more, to appropriately adjust the sampling frequency corresponding to a processing speed, such as an A/D conversion speed, in cosine signal converting unit 202, sine signal converting unit 203, and excitation signal converting unit 208.

In this relative angle determining device according to the first embodiment, the sampling timings of the cosine signal and the sine signal are set to a timing at which the excitation signal reaches a peak or trough value based on the timer signal and the reference signal. A presence or absence of a phase shift between the excitation signal and the timer signal is detected based on a change in A/D converted value at the time when the voltage value of the excitation signal is sampled at the sampling timing. Therefore, according to the relative angle determining device of the first embodiment, it is possible to detect a presence or absence of a phase shift between the excitation signal and the timer signal even when the microcomputer of VCR controller 200 is not provided with a built-in self-test (BIST) function or a monitoring timer for measuring periods for monitoring the synchronization between the timer signal and the excitation signal. Therefore, it is possible to achieve both the detection of the phase shift and the cost reduction.

Furthermore, according to the relative angle determining device according to the first embodiment, since it is possible to detect a presence or absence of a phase shift between the excitation signal and the timer signal, it is also possible to estimate whether a phase shift has occurred between various signals and the timer or excitation signal after VCR controller 200 performs initial phase alignment of the timer or excitation signal with respect to various signals that synchronize with the excitation signal, such as a PWM timer signal or a timer signal for interrupt processing.

Second Embodiment

Next, a second embodiment of the relative angle determining device will be described. The same configurations as in the first embodiment are denoted by the same reference numerals and their descriptions will therefore be omitted or simplified.

Figure 8:
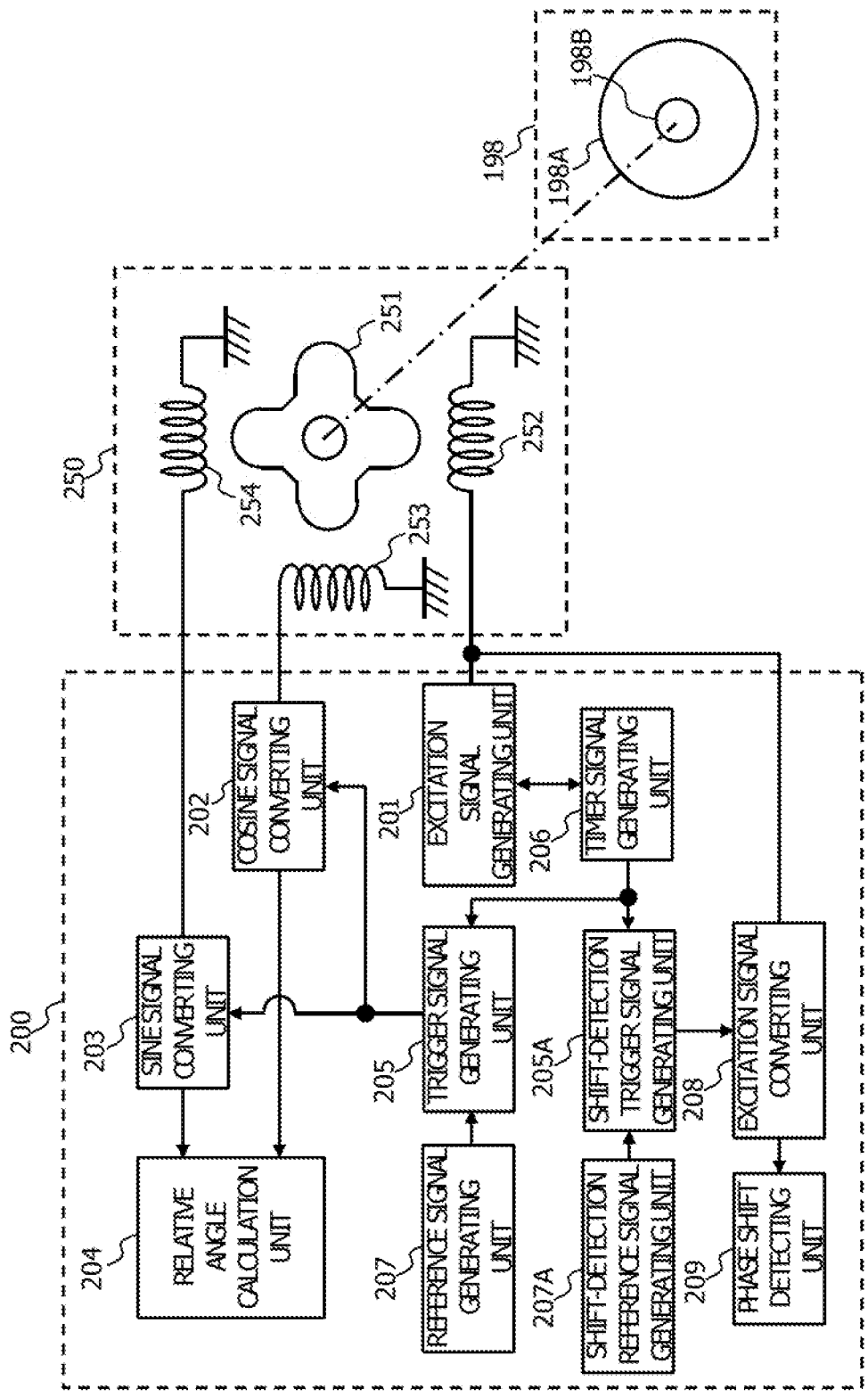
FIG. 8 is a configuration diagram illustrating an example of a relative angle determining device according to a second embodiment.

FIG. 8 illustrates an example of the second embodiment of the relative angle determining device that determines relative angle θr. The relative angle determining device of the second embodiment differs from that of the first embodiment in that a sampling timing of A/D conversion differs between cosine signal converting unit 202 and sine signal converting unit 203, and excitation signal converting unit 208. Specifically, VCR controller 200 further includes a shift-detection trigger signal generating unit 205A and a shift-detection reference signal generating unit 207A. Although trigger signal generating unit 205 generates a trigger signal serving as a reference for sampling timings in cosine signal converting unit 202 and sine signal converting unit 203, shift-detection trigger signal generating unit 205A generates a shift-detection trigger signal serving as a reference for sampling timings in excitation signal converting unit 208. Although reference signal generating unit 207 generates a reference signal for generating the trigger signal by trigger signal generating unit 205, shift-detection reference signal generating unit 207A generates a shift-detection reference signal for generating the shift-detection trigger signal by shift-detection trigger signal generating unit 205A.

The shift-detection reference signal generated in shift-detection reference signal generating unit 207A has a voltage level (voltage value) different from that of the reference signal generated in reference signal generating unit 207. That is, the level of the shift-detection reference signal is set in advance such that the rising (or falling) timing of the shift-detection trigger signal generated in shift-detection trigger signal generating unit 205A based on the shift-detection reference signal and the timer signal coincides with a timing at which the excitation signal has a voltage value other than the peak and trough values in one period of the excitation signal. Therefore, the timing at which excitation signal converting unit 208 samples the excitation signal is the rising (or falling) timing of the shift-detection trigger signal, and a voltage value other than the peak and trough values in one period of the excitation signal is sampled. That is, excitation signal converting unit 208 periodically samples the excitation signal at a timing different from that of cosine signal converting unit 202 and sine signal converting unit 203. Excitation signal converting unit 208 sequentially stores A/D converted value $AD2_n$(n=1, 2, . . . ), which is digital data obtained by the A/D conversion of a voltage value of the sampled excitation signal, in a volatile memory, such as random access memory (RAM).

Figure 9:
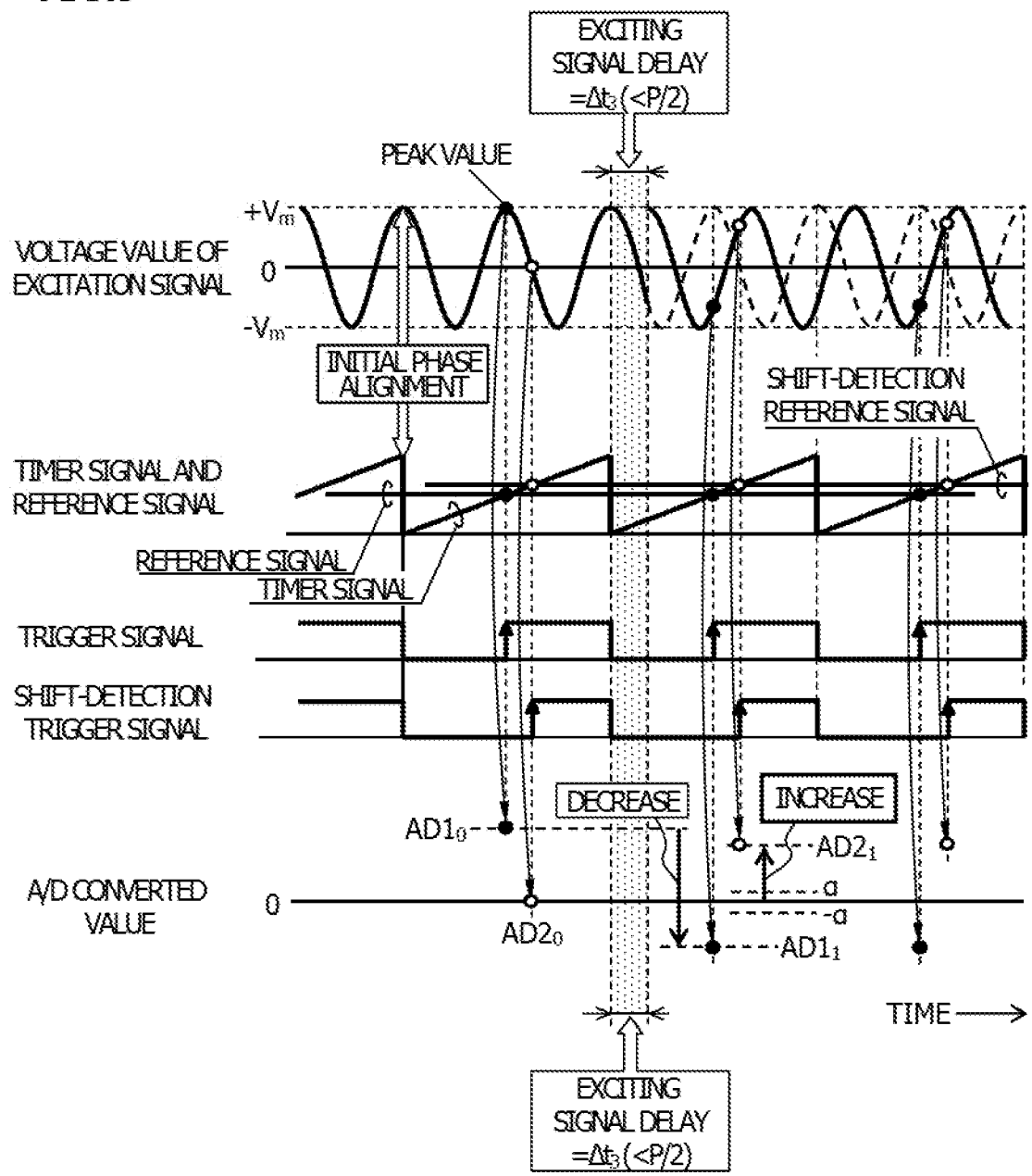
FIG. 9 is a timing diagram illustrating a change in excitation signal converted value caused by a delay of an excitation signal.

FIG. 9 illustrates an example of an A/D converted value of the excitation signal in a case in which delay Δt3 less than half period (P/2) has occurred in the excitation signal with respect to the timer signal. The level of the shift-detection reference signal generated in shift-detection reference signal generating unit 207A is set in advance such that the rising (or falling) timing of the shift-detection trigger signal generated in shift-detection trigger signal generating unit 205A based on the shift-detection reference signal and the timer signal coincides with a timing at which the voltage value of the excitation signal is zero (0).

First, a case in which excitation signal converting unit 208 samples the excitation signal using the rising (or falling) of the shift-detection trigger signal as a trigger, after the initial phase alignment between the excitation signal and the timer signal, will be described. In this case, when no delay has occurred in the excitation signal with respect to the timer signal, the voltage value of the excitation signal is zero. Thus, assuming that the A/D converted value by excitation signal converting unit 208 at this time is $AD2_0$, A/D converted value $AD2_0$ is zero. On the other hand, when delay Δt3 less than half period (P/2) has occurred in the excitation signal with respect to the timer signal, excitation signal converting unit 208 samples the excitation signal at a timing at which the voltage value of the excitation signal is greater than zero. Thus, assuming that the A/D converted value by excitation signal converting unit 208 at this time is $AD2_1$, A/D converted value $AD2_1$ is a value greater than A/D converted value $AD2_0$, which is zero.

In contrast, a provisional case in which excitation signal converting unit 208 samples the excitation signal using, as a trigger, the rising (or falling) of the trigger signal generated in trigger signal generating unit 205 based on comparison between the timer signal and the reference signal, after the initial phase alignment between the excitation signal and the timer signal, similarly to the first embodiment, will be discussed. In this case, when no delay has occurred in the excitation signal with respect to the timer signal, the peak value is sampled. Thus, assuming that the A/D converted value by excitation signal converting unit 208 at this time is $AD1_0$, A/D converted value $AD1_0$ corresponds to maximum voltage value ($+V_m$) of the excitation signal. On the other hand, when delay Δt3 less than half period (P/2) has occurred in the excitation signal with respect to the timer signal, excitation signal converting unit 208 samples a voltage value less than maximum voltage value ($+V_m$) of the excitation signal. Thus, assuming that the A/D converted value by excitation signal converting unit 208 at this time is $AD1_1$, A/D converted value $AD1_1$ is a value less than A/D converted value $AD1_0$.

Figure 10:
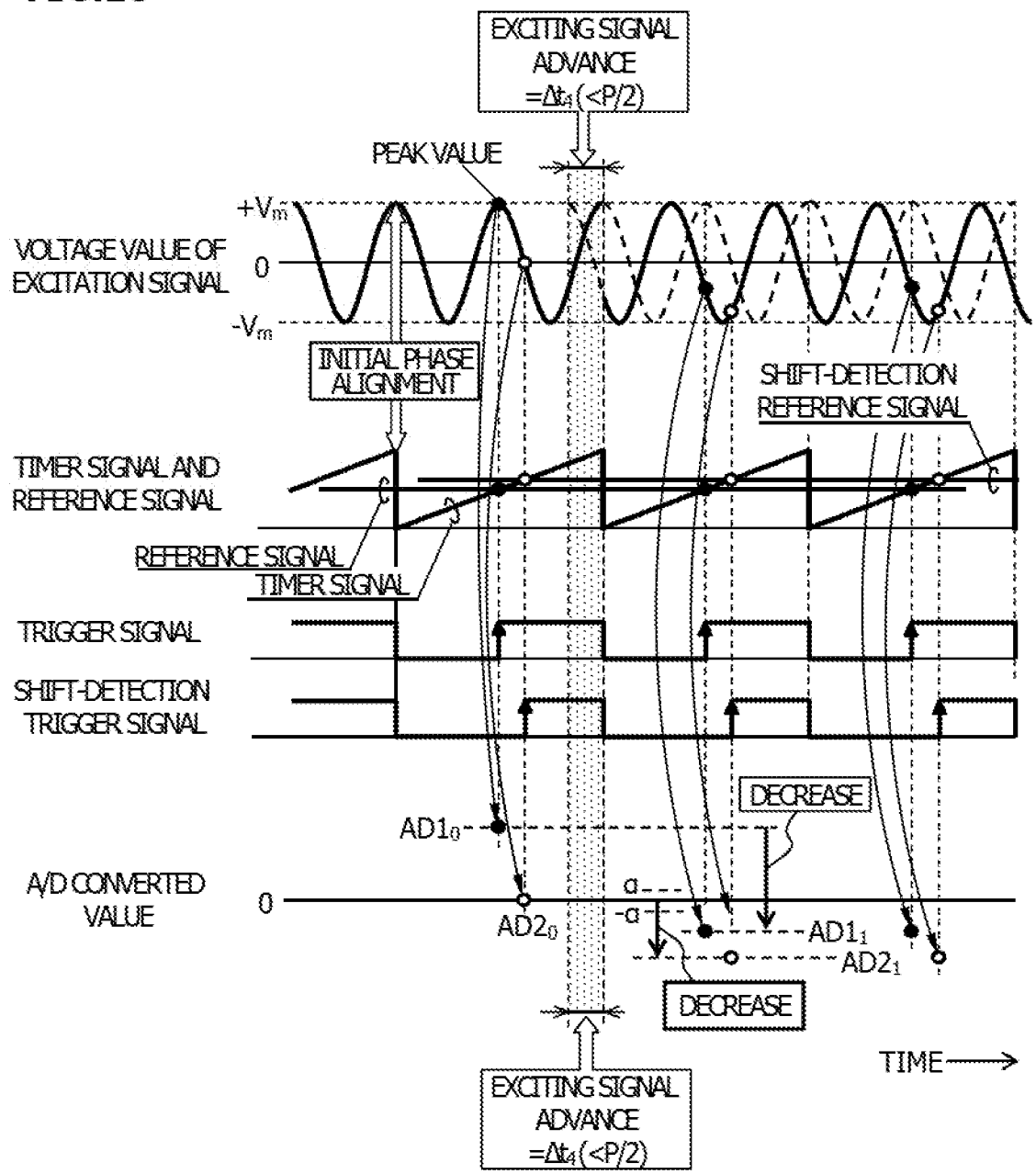
FIG. 10 is a timing diagram illustrating a change in excitation signal converted value caused by an advance of the excitation signal.

FIG. 10 illustrates an example of an A/D converted value of the excitation signal in a case in which advance Δt4 less than half period (P/2) has occurred in the excitation signal with respect to the timer signal. First, a case in which excitation signal converting unit 208 samples the excitation signal using the rising (or falling) of the shift-detection trigger signal as a trigger, after the initial phase alignment between the excitation signal and the timer signal, will be described. In this case, when no advance has occurred in the excitation signal with respect to the timer signal, A/D converted value $AD2_0$ by excitation signal converting unit 208 is zero, as described above. On the other hand, when advance Δt4 less than half period (P/2) has occurred in the excitation signal with respect to the timer signal, excitation signal converting unit 208 samples the excitation signal at a timing at which the voltage value of the excitation signal is less than zero. Thus, assuming that the A/D converted value by excitation signal converting unit 208 at this time is $AD2_1$, A/D converted value $AD2_1$ is a value less than A/D converted value $AD2_0$.

In contrast, a provisional case in which excitation signal converting unit 208 samples the excitation signal using, as a trigger, the rising (or falling) of the trigger signal generated in trigger signal generating unit 205 based on comparison between the timer signal and the reference signal, after the initial phase alignment between the excitation signal and the timer signal, similarly to the first embodiment, will be discussed. In this case, when no advance has occurred in the excitation signal with respect to the timer signal, A/D converted value $AD1_0$ by excitation signal converting unit 208 corresponds to maximum voltage value $(+V_m)$, as described above. On the other hand, when advance $\Delta t4$ less than half period (P/2) has occurred in the excitation signal with respect to the timer signal, excitation signal converting unit 208 samples a voltage value less than maximum voltage value $(+V_m)$ of the excitation signal. Thus, assuming that the A/D converted value by excitation signal converting unit 208 at this time is $AD1_1$, A/D converted value $AD1_1$ is a value less than A/D converted value $AD1_0$.

Thus, excitation signal converting unit 208 according to the second embodiment differs from that of the first embodiment in which the sampling timing of the excitation signal is set to a timing at which the excitation signal reaches a peak or trough value in one period of the excitation signal, similarly to the sampling timing of the cosine signal and the sine signal. That is, excitation signal converting unit 208 according to the second embodiment is configured to sample the voltage value of the excitation signal at a timing at which the excitation signal has a voltage value other than the peak and trough values of the excitation signal, such as a timing when the excitation signal is zero. Thus, when a delay less than half period (P/2) has occurred in the excitation signal with respect to the timer signal, the A/D converted value increases, whereas when an advance less than half period (P/2) has occurred in the excitation signal with respect to the timer signal, the A/D converted value decreases. Thus, by monitoring A/D converted value $AD2_n(n=1, 2, \ldots)$ held in a volatile memory by phase shift detecting unit 209, it is possible to identify whether the phase shift is a delay or an advance, in addition to a presence or absence of a phase shift, if the phase shift is less than half period (P/2) of the excitation signal.

Phase shift detecting unit 209 determines whether A/D converted value $AD2_n(n=1, 2, \ldots)$ stored in the volatile memory increases or decreases with respect to A/D converted value $AD2_0$ obtained by the A/D conversion of the voltage value (for example, zero) of the excitation signal sampled in a state in which no phase shift has occurred. Then, when phase shift detecting unit 209 determines that A/D converted value $AD2_n$ increases, phase shift detecting unit 209 diagnoses that a delay has occurred in the excitation signal with respect to the timer signal. On the other hand, when phase shift detecting unit 209 determines that A/D converted value $AD2_n$ decreases, phase shift detecting unit 209 diagnoses that an advance has occurred in the excitation signal with respect to the timer signal. A/D converted value $AD2_0$ is stored in advance in a non-volatile memory, such as a ROM.

Specifically, for example, in VCR controller 200, a predetermined range $(-\alpha \leq AD2_0 \leq \alpha)$ including A/D converted value $AD2_0$ is stored in advance in a non-volatile memory, such as a ROM. When A/D converted value $AD2_n$ $(n=1, 2, \ldots )$ satisfies $AD2_n > \alpha$, phase shift detecting unit 209 determines that A/D converted value $AD2_n$ increases with respect to A/D converted value $AD2_0$, and diagnoses that a delay has occurred in the excitation signal with respect to the timer signal. On the other hand, when A/D converted value $AD2_n(n=1, 2, \ldots )$ satisfies $AD2_n < -\alpha$, phase shift detecting unit 209 determines that A/D converted value $AD2_n$ decreases with respect to A/D converted value $AD2_0$, and diagnoses that an advance has occurred in the excitation signal with respect to the timer signal. When phase shift detecting unit 209 determines that A/D converted value $AD2_n$ satisfies $-\alpha \leq AD2_0 \leq \alpha$, phase shift detecting unit 209 diagnoses that no phase shift has occurred between the timer signal and the excitation signal.

In the relative angle determining device according to the second embodiment, excitation signal converting unit 208 is described to have the configuration that samples the excitation signal and performs the A/D conversion, once in a period of the timer signal. However, alternatively, sampling of the excitation signal and the A/D conversion may be performed multiple times in a period of the timer signal, to improve the accuracy of phase shift detection. Thus, shift-detection reference signal generating unit 207A may be configured to generate multiple shift-detection reference signals having different voltage levels, and shift-detection trigger signal generating unit 205A may be configured to generate multiple shift-detection trigger signals corresponding to the multiple shift-detection reference signals.

In this relative angle determining device according to the second embodiment, the sampling timing of the excitation signal is set to a timing at which the excitation signal has a voltage value other than the peak and trough values, such as a timing at which the voltage value of the excitation signal is zero, in contrast to the sampling times of the cosine and sine signals. A presence or absence of a phase shift between the excitation signal and the timer signal is detected based on a change in A/D converted value at the time when the voltage value of the excitation signal is sampled at the sampling timing. Thus, it is possible not only to achieve both detection of a presence or absence of a phase shift and cost reduction similarly to the first embodiment, but also to identify whether the phase shift is a delay or an advance if the phase shift is less than half period (P/2) of the excitation signal.

In the relative angle determining device according to the first embodiment, the sampling in excitation signal converting unit 208 is performed at the timing at which the excitation signal reaches the peak or trough value, which coincides with the sampling timings in cosine signal converting unit 202 and sine signal converting unit 203. Alternatively, in order to improve the detection accuracy of a phase shift between the excitation signal and the timer signal, the sampling in excitation signal converting unit 208 may be performed as follows. That is, the relative angle determining device may be configured so that, when the sampling in cosine signal converting unit 202 and sine signal converting unit 203 is performed at the timing at which the excitation signal reaches the peak value, the sampling in excitation signal converting unit 208 is performed at one or more additional timings (for example, at a timing at which the excitation signal reaches the trough value), in addition to the timing at which the excitation signal reaches the peak value. The relative angle determining device may be configured so that, when the sampling in cosine signal converting unit 202 and sine signal converting unit 203 is performed at the timing at which the excitation signal reaches the trough value, the sampling in excitation signal converting unit 208 is performed at one or more additional timings (for example, at a timing at which the excitation signal reaches the peak value), in addition to the timing at which the excitation signal reaches the trough value.

Furthermore, in the relative angle determining device according to the second embodiment, the sampling in excitation signal converting unit 208 is performed at the timing at which the excitation signal has a voltage value other than the peak and trough values in one period of the excitation signal. Alternatively, in order to improve the detection accuracy of a phase shift between the excitation signal and the timer signal, the sampling in excitation signal converting unit 208 may be performed as follows. That is, shift-detection reference signal generating unit 207A may set levels of multiple shift-detection reference signals such that, when the sampling in cosine signal converting unit 202 and sine signal converting unit 203 is performed at the timing at which the excitation signal reaches the peak value, the sampling in excitation signal converting unit 208 is performed at multiple timings at which the excitation signal has a voltage value other than the peak value (for example, at timings at which the voltage value of the excitation signal is the trough value and zero). Furthermore, shift-detection reference signal generating unit 207A may set levels of multiple shift-detection reference signals such that, when the sampling in cosine signal converting unit 202 and sine signal converting unit 203 is performed at the timing at which the excitation signal reaches the trough value, the sampling in excitation signal converting unit 208 is performed at multiple timings at which the excitation signal has a voltage value other than the trough value (for example, at timings at which the voltage value of the excitation signal is the peak value and zero).

In the first and second embodiments, the relative angle determining device is constituted by resolver 250 and a part of VCR controller 200. However, instead of a part of VCR controller 200, a part of engine controller 220 or another control device may be used to constitute the relative angle determining device.

Relative angle calculating unit 204 and phase shift detecting unit 209, which are a part of the relative angle determining device, may be implemented by reading a program stored in advance in a non-volatile memory, such as a read only memory (ROM) in the processor of VCR controller 200, or may be partially or entirely implemented by the hardware configuration. Furthermore, another configuration of the relative angle determining device may be partially or entirely implemented by hardware; for example, trigger signal generating unit 205 may be configured as a comparing circuit provided with a comparator.

The first and second embodiments illustrate, as an example of the rotational angle determining device of the present invention, the relative angle detecting device in which rotor 251 of resolver 250 is connected to output shaft 198B of compression ratio control actuator 198 in VCR mechanism 190. However, the present invention is not limited thereto. Rotor 251 of resolver 250 may be connected to an output shaft of an actuator for controlling the rotational angle of a rotating element in an internal combustion engine, such as a valve event and lift (VEL), which is a valve operation angle and lift continuously variable system, and a valve timing control system (VTC), which is a variable valve mechanism.

In the foregoing, although the invention made by the inventors has been specifically described based on the first and second embodiments, the present invention is not limited to these embodiments. Various modifications can be made without departing from the gist of the invention.

REFERENCE SYMBOL LIST

200 VCR controller
250 Resolver
251 Rotor
252 Exciting coil
253, 254 Detecting coils
201 Excitation signal generating unit
202 Cosine signal converting unit
203 Sine signal converting unit
204 Relative angle calculating unit
205 Trigger signal generating unit
205A Shift-detection trigger signal generating unit
206 Timer signal generating unit
207 Reference signal generating unit
207A Shift-detection reference signal generating unit
208 Excitation signal converting unit
209 Phase shift detecting unit

The invention claimed is:

1. A rotational angle determining device comprising:
a resolver that receives an alternating current excitation signal, and outputs an alternating current resolver signal induced by the excitation signal and having an amplitude that changes corresponding to a rotational angle of a rotor;
a resolver signal converting unit that periodically samples the resolver signal at a timing at which the excitation signal reaches a peak or trough value in a case in which no phase shift has occurred between the excitation signal and a timer signal, based on the timer signal to which initial phase alignment is performed with respect to the excitation signal, and performs A/D conversion of a voltage value of the sampled resolver signal; and
a rotational angle calculating unit that calculates a rotational angle of the rotor based on a first converted value obtained by the A/D conversion performed by the resolver signal converting unit,
the rotational angle determining device further comprising:
an excitation signal converting unit that periodically samples the excitation signal at a predetermined timing based on the timer signal, and performs A/D conversion of a voltage value of the sampled excitation signal; and
a phase shift detecting unit that detects a presence or absence of a phase shift based on a second converted value obtained by the A/D conversion performed by the excitation signal converting unit,
wherein the excitation signal converting unit periodically samples the excitation signal at a timing different from the timing at which the resolver signal converting unit samples the resolver signal, and
wherein the phase shift detecting unit identifies a direction of the phase shift based on an increase or decrease of the second converted value obtained by the A/D conversion performed by the excitation signal converting unit.

2. The rotational angle determining device according to claim 1, wherein the phase shift detecting unit identifies that the phase shift has occurred in a delay direction when determining that the second converted value increases, whereas the phase shift detecting unit identifies that the phase shift has occurred in an advance direction when determining that the second converted value decreases.

3. The rotational angle determining device according to claim 1, wherein the excitation signal converting unit periodically samples the excitation signal at multiple timings.

4. The rotational angle determining device according to claim 1, wherein the timer signal has a period which is a predetermined multiple of a period of the excitation signal.

5. A rotational angle determining device comprising:
a resolver that receives an alternating current excitation signal, and outputs an alternating current resolver signal induced by the excitation signal and having an amplitude that changes corresponding to a rotational angle of a rotor;
a resolver signal converting unit that periodically samples the resolver signal at a timing at which the excitation signal reaches a peak or trough value in a case in which no phase shift has occurred between the excitation signal and a timer signal, based on the timer signal to which initial phase alignment is performed with respect to the excitation signal, and performs A/D conversion of a voltage value of the sampled resolver signal; and
a rotational angle calculating unit that calculates a rotational angle of the rotor based on a first converted value obtained by the A/D conversion performed by the resolver signal converting unit,
the rotational angle determining device further comprising:
an excitation signal converting unit that periodically samples the excitation signal at a predetermined timing based on the timer signal, and performs A/D conversion of a voltage value of the sampled excitation signal; and
a phase shift detecting unit that detects a presence or absence of a phase shift based on a second converted value obtained by the A/D conversion performed by the excitation signal converting unit,
wherein the rotor of the resolver is connected to an output shaft of an actuator that controls a rotational angle of a rotating element in an internal combustion engine,
wherein the actuator that controls the rotational angle of the rotating element in the internal combustion engine is a compression ratio control actuator of a variable compression ratio mechanism that controls the compression ratio of the internal combustion engine to be variable,
wherein when the phase shift detecting unit detects the phase shift, fail-safe processing is performed, and
wherein the fail-safe processing is to stop a feedback control for causing an actual compression ratio of the internal combustion engine to converge to a target compression ratio.

6. A rotational angle determining device comprising:
a resolver that receives an alternating current excitation signal, and outputs an alternating current resolver signal induced by the excitation signal and having an amplitude that changes corresponding to a rotational angle of a rotor;
a resolver signal converting unit that periodically samples the resolver signal at a timing at which the excitation signal reaches a peak or trough value in a case in which no phase shift has occurred between the excitation signal and a timer signal, based on the timer signal to which initial phase alignment is performed with respect to the excitation signal, and performs A/D conversion of a voltage value of the sampled resolver signal; and
a rotational angle calculating unit that calculates a rotational angle of the rotor based on a first converted value obtained by the A/D conversion performed by the resolver signal converting unit,
the rotational angle determining device further comprising:
an excitation signal converting unit that periodically samples the excitation signal at a predetermined timing based on the timer signal, and performs A/D conversion of a voltage value of the sampled excitation signal; and
a phase shift detecting unit that detects a presence or absence of a phase shift based on a second converted value obtained by the A/D conversion performed by the excitation signal converting unit,
wherein the rotor of the resolver is connected to an output shaft of an actuator that controls a rotational angle of a rotating element in an internal combustion engine,
wherein the actuator that controls the rotational angle of the rotating element in the internal combustion engine is a compression ratio control actuator of a variable compression ratio mechanism that controls the compression ratio of the internal combustion engine to be variable,
wherein when the phase shift detecting unit detects the phase shift, fail-safe processing is performed, and
wherein the fail-safe processing is to stop energization to the compression ratio control actuator.

7. A rotational angle determining device comprising:
a resolver that receives an alternating current excitation signal, and outputs an alternating current resolver signal induced by the excitation signal and having an amplitude that changes corresponding to a rotational angle of a rotor;
a resolver signal converting unit that periodically samples the resolver signal at a timing at which the excitation signal reaches a peak or trough value in a case in which no phase shift has occurred between the excitation signal and a timer signal, based on the timer signal to which initial phase alignment is performed with respect to the excitation signal, and performs A/D conversion of a voltage value of the sampled resolver signal; and
a rotational angle calculating unit that calculates a rotational angle of the rotor based on a first converted value obtained by the A/D conversion performed by the resolver signal converting unit,
the rotational angle determining device further comprising:
an excitation signal converting unit that periodically samples the excitation signal at a predetermined timing based on the timer signal, and performs A/D conversion of a voltage value of the sampled excitation signal; and
a phase shift detecting unit that detects a presence or absence of a phase shift based on a second converted value obtained by the A/D conversion performed by the excitation signal converting unit,
wherein the rotor of the resolver is connected to an output shaft of an actuator that controls a rotational angle of a rotating element in an internal combustion engine,
wherein the actuator that controls the rotational angle of the rotating element in the internal combustion engine is a compression ratio control actuator of a variable compression ratio mechanism that controls the compression ratio of the internal combustion engine to be variable,
wherein when the phase shift detecting unit detects the phase shift, fail-safe processing is performed, and
wherein the fail-safe processing is to forcibly actuate the compression ratio control actuator to an initial position.

8. A phase shift detection method of a rotational angle determining device including:
- a resolver that receives an alternating current excitation signal, and outputs an alternating current resolver signal induced by the excitation signal and having an amplitude that changes corresponding to a rotational angle of a rotor;
- a resolver signal converting unit that periodically samples the resolver signal at a timing at which the excitation signal reaches a peak or trough value in a case in which no phase shift has occurred between the excitation signal and a timer signal, based on the timer signal to which initial phase alignment is performed with respect to the excitation signal and performs A/D conversion of a voltage value of the sampled resolver signal; and
- a rotational angle calculating unit that calculates a rotational angle of the rotor based on a first converted value obtained by the A/D conversion performed by the resolver signal converting unit, the phase shift detection method comprising the steps, performed by the rotational angle determining device, of:

periodically sampling the excitation signal at a predetermined timing based on the timer signal;

performing the A/D conversion of a voltage value of the sampled excitation signal to obtain a second converted value; and detecting a presence or absence of a phase shift based on the second converted value, wherein the excitation signal converting unit periodically samples the excitation signal at a timing different from the timing at which the resolver signal converting unit samples the resolver signal, and wherein the phase shift detecting unit identifies a direction of the phase shift based on an increase or decrease of the second converted value obtained by the A/D conversion performed by the excitation signal converting unit.

9. The rotational angle determining device according to claim 5, wherein the phase shift detecting unit identifies that the phase shift has occurred in a delay direction when determining that the second converted value increases, whereas the phase shift detecting unit identifies that the phase shift has occurred in an advance direction when determining that the second converted value decreases.

10. The rotational angle determining device according to claim 5, wherein the excitation signal converting unit periodically samples the excitation signal at multiple timings.

11. The rotational angle determining device according to claim 5, wherein the timer signal has a period which is a predetermined multiple of a period of the excitation signal.

12. The rotational angle determining device according to claim 6, wherein the phase shift detecting unit identifies that the phase shift has occurred in a delay direction when determining that the second converted value increases, whereas the phase shift detecting unit identifies that the phase shift has occurred in an advance direction when determining that the second converted value decreases.

13. The rotational angle determining device according to claim 6, wherein the excitation signal converting unit periodically samples the excitation signal at multiple timings.

14. The rotational angle determining device according to claim 6, wherein the timer signal has a period which is a predetermined multiple of a period of the excitation signal.

15. The rotational angle determining device according to claim 7, wherein the phase shift detecting unit identifies that the phase shift has occurred in a delay direction when determining that the second converted value increases, whereas the phase shift detecting unit identifies that the phase shift has occurred in an advance direction when determining that the second converted value decreases.

16. The rotational angle determining device according to claim 7, wherein the excitation signal converting unit periodically samples the excitation signal at multiple timings.

17. The rotational angle determining device according to claim 7, wherein the timer signal has a period which is a predetermined multiple of a period of the excitation signal.

* * * * *